Oct. 13, 1970  W. J. McKEEGAN  3,534,381
DUAL PEN HOLDER
Filed Dec. 23, 1968  3 Sheets-Sheet 1
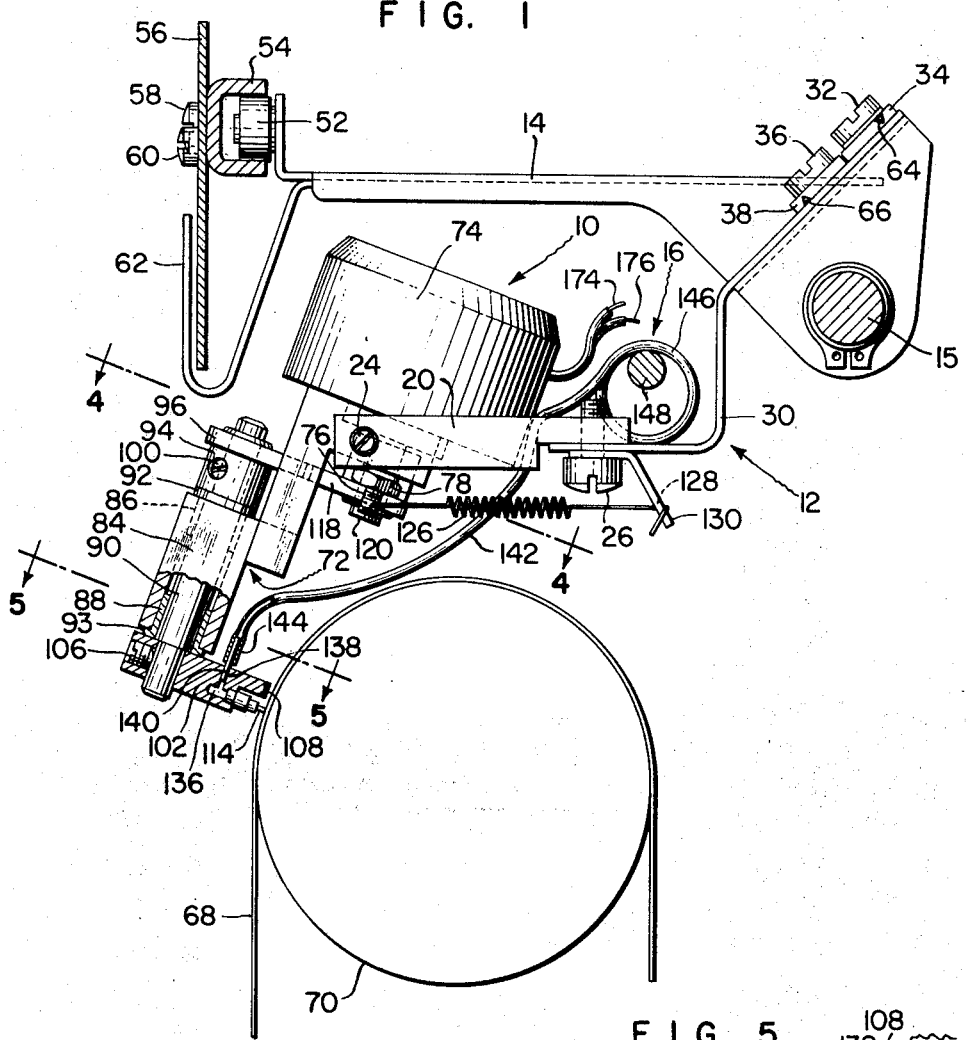
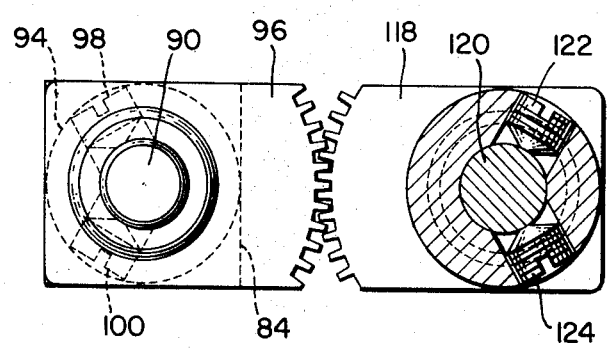
INVENTOR.
WARREN J. McKEEGAN
BY
John Shaw Stevenson
AGENT.

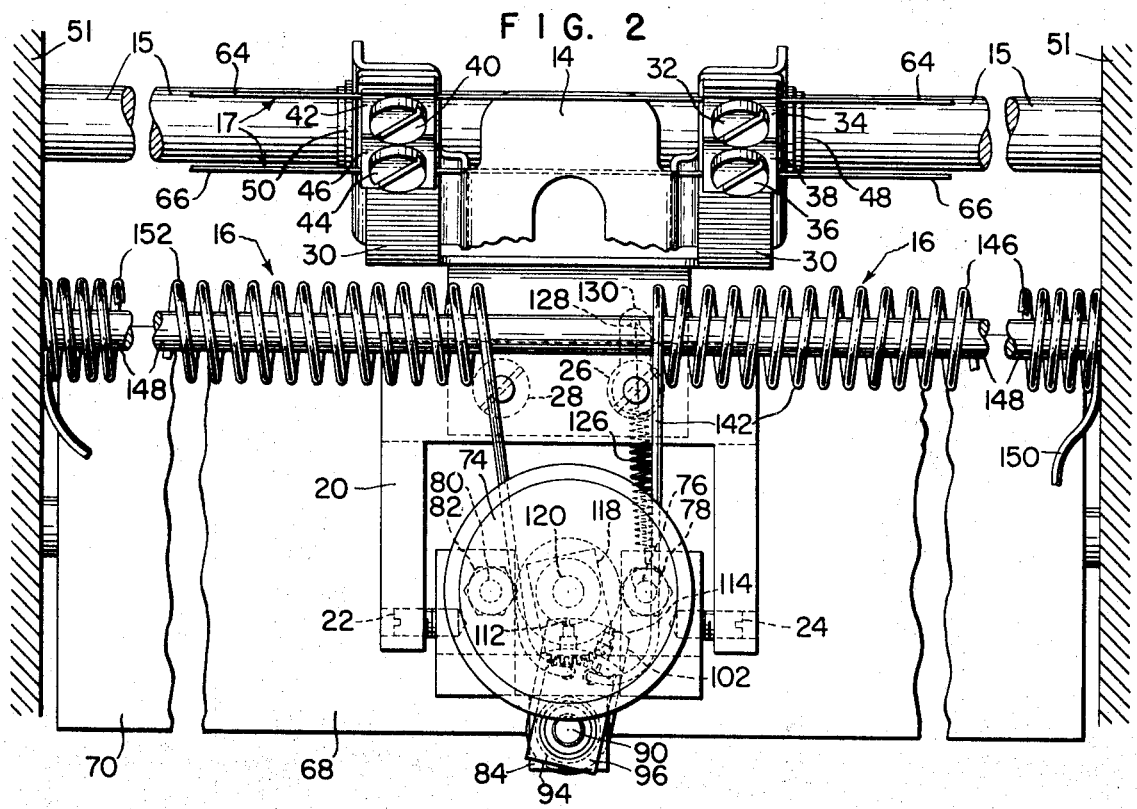
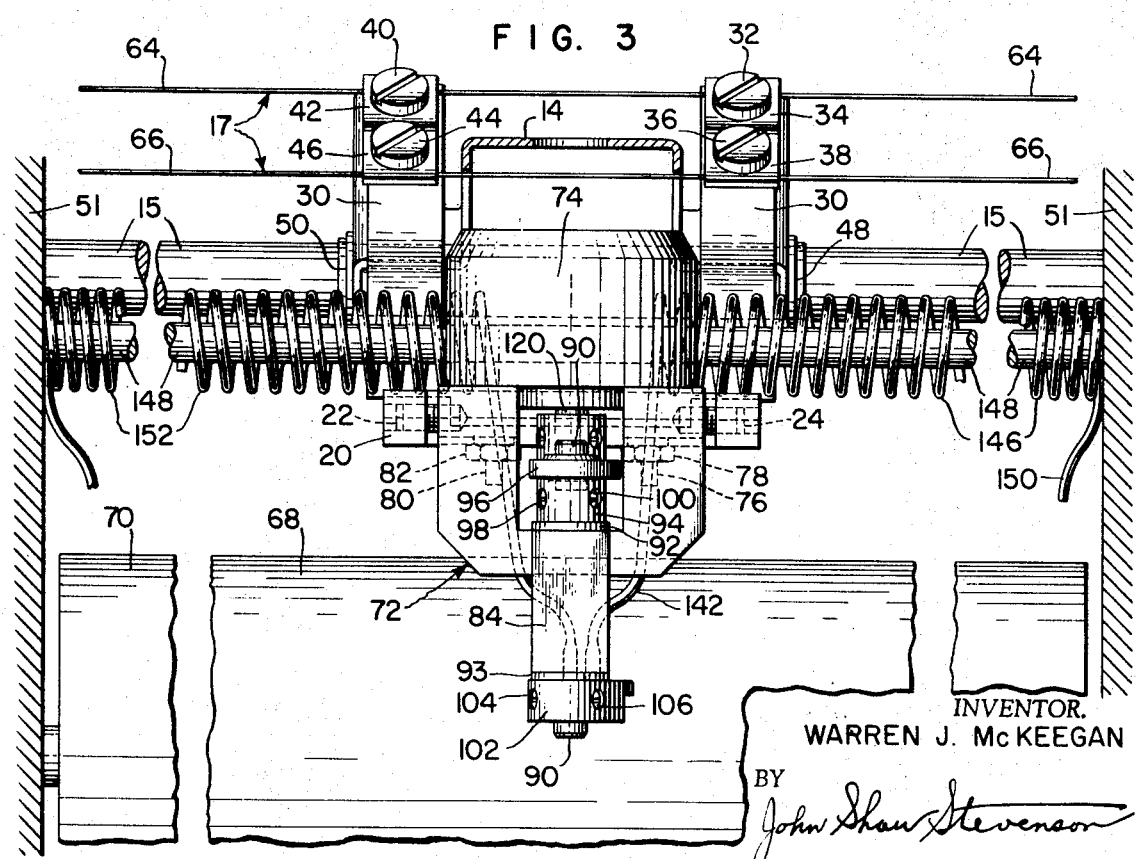

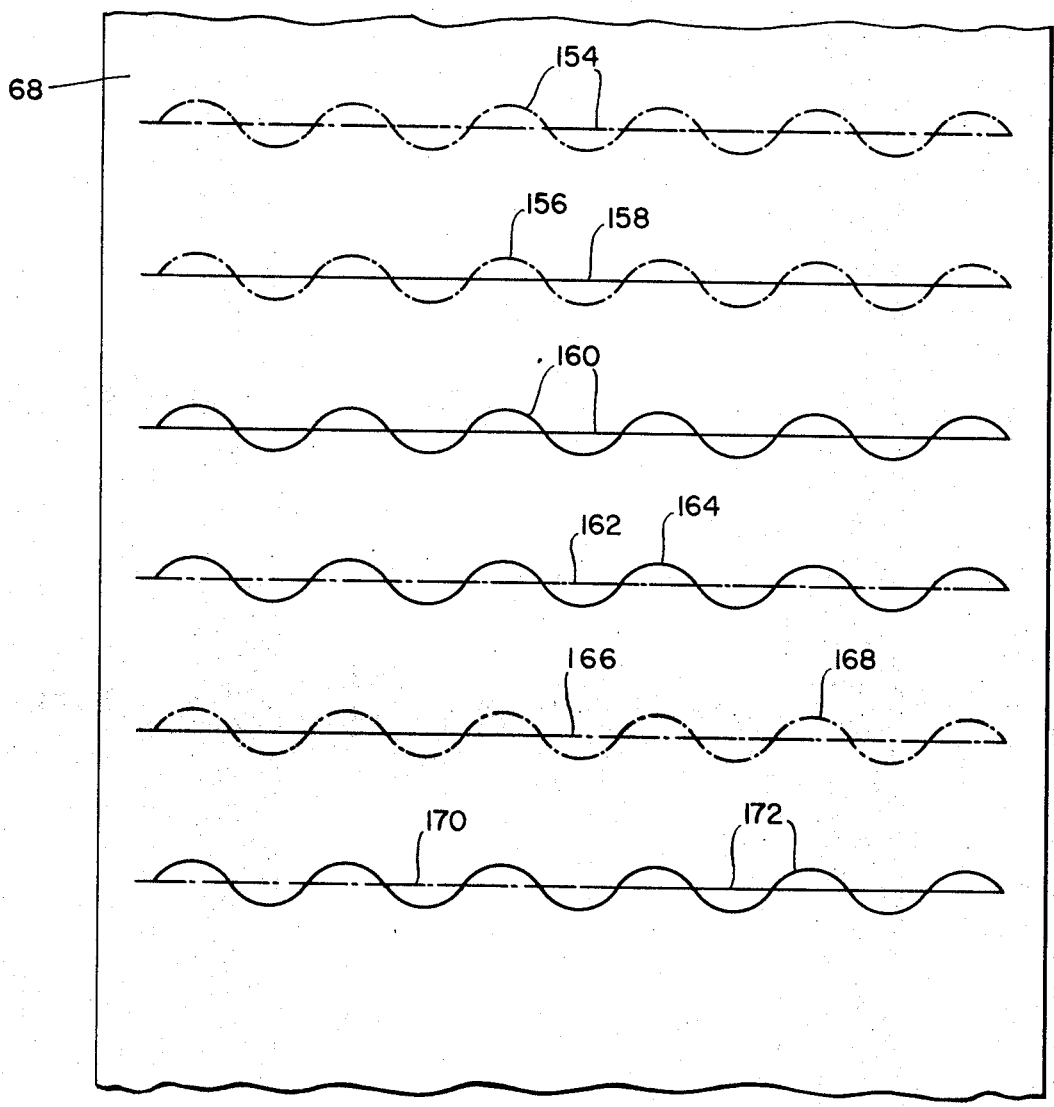

United States Patent Office 3,534,381
Patented Oct. 13, 1970

1

3,534,381
DUAL PEN HOLDER
Warren J. McKeegan, Bala-Cynwyd, Pa., assignor to Honeywell Inc., Minneapolis, Minn., a corporation of Delaware
Filed Dec. 23, 1968, Ser. No. 786,253
Int. Cl. G01d 15/16
U.S. Cl. 346—46         9 Claims

ABSTRACT OF THE DISCLOSURE

This application relates to a unique dual pen holder that has two different colored pens mounted in spaced apart fashion on an arcuate surface of a unitary pen holder so that each pen can be sequentially brought into engagement with the same time line and calibration line of a chart and to enable different lengths of recorded color profiles and reference line patterns to be established so that an operator can readily determine at a glance which one of a series of variables is being recorded on the chart.

---

It is a general object of the present invention to provide a unitary dual pen inking apparatus in which one of the pens commences to record a first identifiable ink line on a chart while the remaining second pen, which has a different identifiable ink line inscribing characteristic is moved out of inking contact with the chart.

It is another specific object of the present invention to provide a unitary dual pen inking apparatus for mounting on a traversing carriage of a profile recorder wherein one or the other of the aforementioned pens are engaged in a selected timed sequence with a chart as they move in one direction across the width of the chart to record a first identifiable profile of the magnitude of a variable thereon and are returned in the opposite direction across the width of the chart to superimpose a reference line through said first mentioned recorded line.

It is still another more specific object of the present invention to provide pens that will each record a different identifiable line on a chart, such as a different color for any one of a number of different selective recording periods of time across the width of the chart, as these pens are moved first in one traversing direction to indicate the magnitude of a variable for example the moisture content that is present at different locations across a first transverse portion of a moving sheet of paper, and as the pens are returned in an opposite traversing direction across the chart for establishing a reference line for the variable that had been recorded.

It is another specific object of the present invention to provide a dual pen which will make it possible to record a series of the aforementioned variable and reference lines on a chart which will identify which one of a series of transverse portions between the ends of a sheet the measurement of moisture or some other variable is being made by observing the respective recorded line pattern layed down by the two different record lines recorded on the chart.

It is another specific object of the persent invention to provide a dual pen which will make it possible to record a series of the aforementioned variable and reference lines on a chart which will identify which one of a series of transverse portions between the ends of a sheet the measurment of moisture or some other variable is being made by observing the respective dual colored line pattern layed down by the two different record lines recorded on the chart.

A better understanding of the present invention may be had from the following detailed description when read in connection with the accompanying drawings in which:

2

FIG. 1 of the drawign shows a side elevation of the dual pen inking apparatus;

FIG. 2 shows a plane view of the pen inking apparatus shown in FIG. 1;

FIG. 3 shows a left side elevational view of the pen inking apparatus shown in FIG. 1;

FIG. 4 is a view taken along the lines 4—4 of FIG. 1;

FIG. 5 is a view taken along the lines 5—5 of FIG. 1 and

FIG. 6 is a view showing several examples of the many different recorded profile and reference patterns that the pen inking apparatus of FIG. 1 can inscribe on a chart.

FIGS. 1, 2, and 3 show a unique unitary dual pen inking apparatus 10 as well as a pen arm support 12, a carriage 14, a chassis supported shaft 15, an inking system 16 and a means 17 for moving the carriage 14 and the pen arm support member 12 with the dual inking apparatus 10 along the shaft 15.

The dual pen inking apparatus 10 is pivotally supported on a U-shaped member 20 that forms a part of the pen arm support 12 by means of two conical pivots 22, 24. The U-shaped support member 20 is in turn supported by means of the tap bolt connections 26, 28 to a bracket 30 which forms another part of the pen arm support 12.

The bracket 30 is in turn fixedly connected by four suitable screws and washer connecting units 32, 34; 36, 38; 40, 42; 44, 46 to the carriage 14. The carriage 14 is constructed with bearing portions 48, 50 thereon for sliding movement along the stationary shaft 16 that is mounted on the chassis 51.

The other end of the carriage 14 has a roller 52 mounted thereon which is shown in rolling engagement with the channel support member 54 which is fixedly connected at its opposite ends to the chassis 51.

An indicating scale 56 is fixedly mounted on the member 54 by means of screw connections 58, 60. The left end of the carriage 14 terminates in a bent portion that forms an indicating pointer 62. A pair of wires 64, 66 which forms a portion of the means 17 employed to move the carriage 14 transversely of the chart 68, that is wrapped about a chart drum 70, are fixedly connected by means of the screw and washer connecting units 32–46 to the carriage 14. When these wires 64, 66 are pulled in a right to left or left to right direction in a conventional fashion by means of a drum mechanism such as is disclosed in the Harrison et al. Pat. 2,442,329, issued May 25, 1948, the carriage 14 and the U-shaped support member 20 will be moved in that direction along the shaft 15 and channel 54.

As is best shown in FIG. 3 the unique dual pen inking apparatus 10 that is pivotally supported on the U-shaped member 20 is comprised of a unitary Y-shaped member 72.

Each of the upper legs of the Y-shaped member 72 are fixedly connected to support a solenoid 74 thereon for free rotation about the pivots 22, 24 by means of a pair of tap bolt and nut connections 76, 78; 80, 82.

The lower end of the member 72 is further fixedly connected to a square hollow column shaped member 84 which supports a pair of sleeve shaped bushings 86, 88 thereon. A shaft 90 is shown supported for rotation on these bushings 86, 88. The upper end of the shaft 90 contains a thrust bearing shaped part 92 forming the upper end of the bushing 86 to support the weight of the shaft 90 on the support sleeve 84 and a similar thrust support 93 forms one end of the bushing 88. Above the member 92 is a unitary sleeve shaped spacer member 94 and gear segment 96 retained in position on the shaft 90 by means of the cone shaped set screws 98, 100.

The other end of the shaft 90 contains a pen holder 102 that is retained in a fixed rotatable position therewith by means of cone shaped set screws 104, 106 and the outer end surface of the pen holder 102 has two arcuate surfaces 108, 110 formed thereon.

A pair of spaced apart pens 112, 114 are shown supported on and projecting away from the arcuate surface 110 and their points are shown extending slightly beyond the other arcuate surface 108 so that they may be separately engaged with the surface of a chart 116.

The gear segment 96 is shown in driven engagement with the gear segment 118. The gear segment 118 in turn is retained on a shaft 120 that extends out of the rotatable solenoid 74 by means of a pair of suitable cone shaped set screws 122, 124.

A biasing means in the form of a coil spring 126 is connected at one end to a wall 128 forming an aperture in the stationary clip 130 which is retained by means of screw 26 to the pen arm support member 20. The other end of the spring 126 is fixed in a suitable manner to the tap bolt 76. The spring 126 is thus utilized to pull the dual pen inking apparatus 10 in a counterclockwise direction on its pivots 22, 24 to a position in which the pens 14 or 12 are always assured of being retained in good physical inking contact with the chart 68.

Each of the pens 112, 114 have a pair of separate passageways 132, 134; 136, 138 formed in the pen holder 102. The metal tube 140 is soldered to the wall of the pen holder 102 that forms the passageway 138 as shown in FIG. 1 and another tube, not shown, but which is similar to the tube 140, protrudes from the passageway 136 shown in FIG. 5.

A flexible capillary tube 142 that forms one portion of the inking system 16 is shown in FIGS. 1–3 as having one end 144 in sealed fluid tight engagement with the tube 140 and a central portion 146 wrapped in spaced apart coil fashion about a statitonary shaft 148 that is fixed to the chassis 51.

As is best shown in FIGS. 2 and 3 the other remaining end 150 of the capillary 144 is connected to an ink supply container, not shown, in order to provide a supply of ink for the pen 114 by way of capillary tube portions 146, 142, 144, 140 and 136.

The other flexible capillary tube 152 is connected at its opposite end portions to supply an independent flow of ink to the pen 112 in the same manner as the capillary tube 142 supplies ink to its associated pen 114.

The capillary systems as just described are similar to that disclosed in the McKeegan Pat. 3,102,770, issued Sept. 3, 1963.

From the aforementioned description it can be seen that the entire unitary dual inking apparatus 10 can be moved with the pen 114 in engagement with the chart 68 from its left edge to its right edge in order to print a first identifiable ink line 154, which may be a first color, thereon as the chart is alternately moved in a forward and reverse direction in accordance with changes in the magnitude of a variable measurement, for example, the moisture content along a transverse section of a moving sheet of material. It can also be seen that this same pen 14 can then be moved in a reverse manner to cause it to travel from the right side of the chart to the left side to establish a reference line of the same aforementioned color through the first recorded line in order to visually indicate the high and low points of the magnitude of the variable for example moisture across the width of the chart.

When a person observing this single color line record of the variable and reference line, which is preferably a red color, it will indicate in a profile form the high and low magnitudes of a variable for example moisture that is present across a first selected transverse portion of a sheet, not shown, being transferred from a supply roll to a take up roll.

Alternately the present unitary dual pen inking apparatus can be moved while the pen 114 is in engagement with the chart 68 from its left edge to its right edge in order to print a third identifiable red ink line 156 representing a second variable for example the moisture profile that is present across another or second transverse portion of the aforementioned sheet of paper.

The solenoid 74 can then be energized to effect the movement of the pen 114 out of engagement with the chart and to effect the movement of the pen 112 having a different colored ink, preferably black, into engagement with the chart 68 just before the pen 112 starts to draw a black reference line 158 through the already recorded red moisture profile line 156 from the right to left side of the chart 68.

When a person observes this characterized two color red then black ink recording 156, 158 to indicate the magnitude of this second variable and its associated reference line it can indicate in another profile form the high and low magnitudes of this second variable which may for example be the moisture that is present across a second selected transverse portion of the aforementioned sheet of paper.

By way of additional examples as shown in FIG. 6 moisture content across other different third, fourth, fifth and sixth portions of the aforementioned sheet of paper whose moisture measurement is to be recorded can be observed by noting the purposely different characterized patterns that are formed on the chart by the distances to which each recorded single colored line 160 or the combination of two different colored variable and reference lines 162, 164; 166, 168; 170, 172, extend back and forth across the chart.

These variations in lengths of the dual colored lines in series that are recorded on a chart can be accomplished by merely sending a local or remote demand signal by way of the transmission wires 174 and 176 to the solenoid which will allow either the desired single pen 112 or 114 or the alternate combination of pens 112 and 114 to be sequentially engaged with the chart over the preselected time desired. In this way a predetermined easy to recognize colored ink profile and reference line patterns are provided that will readily identify the transverse portion between the ends of an elongated sheet of paper along which moisture or some other variable is being sensed.

The embodiments of the invention in which an exclusive property or privilege is claimed are defined as follows:

1. An apparatus for recording either one or two different ink lines on a chart, comprising two pens mounted for movement on a single pen holder, means to advance a first one of said pens into inking engagement with said chart while a second one of said pens is simultaneously moved out of inking engagement with the chart and wherein the means to move the movable pen holder is comprised of a first gear segment actuated by a rotary solenoid, a second gear segment in driven engagement with the first gear segment, a shaft connected for movement with the second gear segment and pen holder, said pen holder having an arcuate shaped portion and being mounted for unitary movement with the shaft, and said pens being positioned in spaced apart relation along said arcuate portion of the holder for alternate engagement with the chart when said solenoid is respectfully energized and deenergized.

2. The recording apparatus defined in claim 1 wherein each of the ink lines made by the respective pens on said chart are of a different color than the other.

3. The recording apparatus defined in claim 1 wherein each of said pens are positioned to record their respective ink lines on the same time and calibration lines of the chart.

4. The recording apparatus defined in claim 1 wherein a solenoid is employed as the means to move each of the pens on the pen holder into and out of engagement with the chart.

5. The recording apparatus defined in claim 1 wherein the means to move the pen holder is comprised of a rotary solenoid and a dual gear segment drive.

6. The recording apparatus defined in claim 1 wherein each of the ink lines made by the respective pens on said chart are of a different color than the other and wherein a biasing means is connected to said pen holder to apply force thereto to maintain either pen that is moved into engagement with the chart into a position on said chart that will effect a good physical inking engagement therewith.

7. The recording apparatus defined in claim 1 wherein said means is further operable to move the second one of said pens into inking engagement with said chart while the first one of said pens is simultaneously moved out of inking engagement with the chart.

8. The recording apparatus defined in claim 1 wherein the pens are positioned in alignment with one another on said pen holder to provide a substantially continuous non-interrupted recording line on said chart when they are brought into and out of inking contact with the chart while a carriage on which said holder is mounted is moved acros the chart.

9. The recording apparatus defined in claim 1 wherein the pens are positioned in alignment with one another on said holder to provide a substantially continuous non-interrupted recording line along the same time and calibration lines that are imprinted on said chart.

References Cited
UNITED STATES PATENTS

| 1,754,503 | 4/1930 | Dwelle | 346—46 X |
| 2,648,976 | 8/1953 | Bur. | |
| 3,108,844 | 10/1963 | Alexander et al. | 346—46 |
| 3,383,702 | 5/1968 | Donahue | 346—140 |

RICHARD B. WILKINSON, Primary Examiner

J. W. HARTARY, Assistant Examiner

U.S. Cl. X.R.

346—23, 140